US007032573B2

(12) United States Patent
Ardisana

(10) Patent No.: US 7,032,573 B2
(45) Date of Patent: Apr. 25, 2006

(54) METHOD AND APPARATUS FOR INDICATING AIR FILTER MAINTENANCE IS REQUIRED

(75) Inventor: John Bernard Ardisana, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 10/831,570

(22) Filed: Apr. 23, 2004

(65) Prior Publication Data

US 2005/0240338 A1 Oct. 27, 2005

(51) Int. Cl.
*F02B 77/04* (2006.01)
*F02M 51/00* (2006.01)
*F02D 11/10* (2006.01)

(52) U.S. Cl. .................. 123/434; 123/198 E; 123/399; 73/118.2

(58) Field of Classification Search ................ 123/434, 123/399, 198 E; 73/118.1, 118.2; 701/102
See application file for complete search history.

(56) References Cited

U.S. PATENT DOCUMENTS 5,205,261 A * 4/1993 Betts, Jr. et al. ............ 123/494
5,429,649 A 7/1995 Robin
5,562,076 A * 10/1996 Madl ...................... 123/198 E
5,604,306 A * 2/1997 Schricker ................... 73/118.2
5,606,311 A * 2/1997 Polidan et al. .............. 340/607
5,681,988 A * 10/1997 Koch et al. ................ 73/118.1
5,744,770 A 4/1998 Moessinger et al.
6,107,923 A * 8/2000 Christol ...................... 340/607
6,192,867 B1 * 2/2001 Fenchel et al. ............. 123/486
6,268,791 B1 7/2001 Ferris
6,327,902 B1 * 12/2001 Berry, III et al. ......... 73/119 R
6,505,505 B1 * 1/2003 Henzinger et al. ......... 73/118.2
6,834,542 B1 * 12/2004 Aschner et al. ............ 73/118.2
6,894,620 B1 * 5/2005 Reinhardt et al. .......... 340/607
2003/0028335 A1 * 2/2003 Wild et al. ..................... 702/50
2004/0178895 A1 * 9/2004 Pontius ...................... 340/439

FOREIGN PATENT DOCUMENTS

KR 2002-085592 * 11/2002
KR 2003-068305 * 8/2003
KR 2004-037719 * 5/2004

OTHER PUBLICATIONS

Information Disclosure Statement filed herewith including the description therein entitled "Barometric Pressure (BP) Determination".

* cited by examiner

*Primary Examiner*—Hai Huynh
(74) *Attorney, Agent, or Firm*—Julia Voutyras; Richard M. Sharkansky

(57) ABSTRACT

A system and method for indicating required maintenance of an air filter used with an internal combustion engine. The system includes a throttle plate for adjusting an amount of airflow passing into cylinders of the engine. The system includes a throttle plate position sensor and a processor. The processor is responsive to a throttle plate position signal produced by the throttle plate sensor, for determining, as a function of such throttle plate position signal, whether the air filter is in need of maintenance. When a manifold absolute pressure sensor is provided, the processor is responsive to a first reading of such manifold absolute pressure sensor taken at a first time and at a second reading of the manifold absolute pressure sensor taken at a second time, for determining, as a function of a difference between such first and second readings whether the air filter is in need of maintenance.

28 Claims, 4 Drawing Sheets

METHOD AND APPARATUS FOR INDICATING AIR FILTER MAINTENANCE IS REQUIRED

TECHNICAL FIELD

This invention relates generally to methods and systems for indicating when an air filter used with an internal combustion engine requires maintenance.

BACKGROUND

As is known in the art, it is describable to provide an indication that the air filter used in an internal combustion engine is in need of maintenance, such as when it becomes clogged or sufficiently dirty to adversely effect engine performance. Further, any system and method used to provide such indication must be relatively inexpensive yet reliable enough to minimize false maintenance requirement indications.

SUMMARY

In accordance with the present invention, a system is provided for indicating required maintenance of an air filter used with an internal combustion engine. The system includes a throttle plate for adjusting an amount of airflow passing into cylinders of the engine. The system includes a throttle plate position sensor and a processor. The processor is responsive to a throttle plate position signal produced by the throttle plate sensor, for determining, as a function of such throttle plate position signal, whether the air filter is in need of maintenance.

In one embodiment, the system includes a manifold absolute pressure sensor disposed between the throttle plate and the cylinders. The processor is responsive to the throttle plate position signal and a signal produced by the manifold absolute pressure sensor, for determining, as a function of such throttle plate position signal and manifold absolute pressure sensor, whether the air filter is in need of maintenance.

In one embodiment, the system includes: a mass air flow sensor disposed downstream of the air filter. The processor includes a table storing a relationship between throttle plate position and expected air mass flow into the cylinders as a function of engine speed. The processor is responsive to a signal indicative of engine speed and the throttle plate position signal for determining from the table an expected airflow. The processor determines a difference between the determined expected air flow and a signal produced by the mass air flow sensor, for determining, as a function of such difference, whether the air filter is in need of maintenance.

In one embodiment, the system includes a manifold absolute pressure sensor disposed between the throttle plate and the cylinders. The processor is responsive to a first reading of such manifold absolute pressure sensor taken at a first time and at a second reading of the manifold absolute pressure sensor taken at a second time, for determining, as a function of a difference between such first and second readings whether the air filter is in need of maintenance.

In accordance with another feature of the invention, a system is provided for indicating required maintenance of an air filter used with an internal combustion engine. The system includes a manifold absolute pressure sensor and a processor. The processor is responsive to a first reading of such manifold absolute pressure sensor taken at a first time and at a second reading of the manifold absolute pressure sensor taken at a second time, for determining, as a function of a difference between such first and second readings whether the air filter is in need of maintenance.

In accordance with yet another feature of the invention, a method is provided for indicating required maintenance of an air filter used with an internal combustion engine, such engine including a throttle plate for adjusting an amount of airflow passing into cylinders of the engine. The method includes determining, as a function of a throttle plate position signal produced by a throttle plate position sensor, whether the air filter is in need of maintenance.

In one embodiment, the method determines required air filter maintenance as a function of the throttle plate position signal and a signal produced by an manifold absolute pressure sensor disposed between the throttle plate and the cylinders.

In one embodiment, the method determines required air filter maintenance as a function a signal indicative of engine speed and the throttle plate position signal for determining an expected air flow, and a difference between the determined expected air flow and a signal produced by an mass air flow sensor.

In one embodiment, the method determines required air filter maintenance as a function a difference between a first reading of a manifold absolute pressure sensor taken at a first time and at a second reading of the manifold absolute pressure sensor taken at a second time.

In one embodiment the first reading is representative of barometric pressure. In one embodiment the first reading is taken at engine power-up.

In accordance with still another feature of the invention, a method is provided for indicating required maintenance of an air filter used with an internal combustion engine. The method includes obtaining a first reading of a manifold absolute pressure sensor at a first time and at a second reading of the manifold absolute pressure sensor taken at a second time; and determining, as a function of a difference between such first and second readings whether the air filter is in need of maintenance.

In one embodiment, the first reading is representative of barometric pressure.

In one embodiment the first reading is taken at engine power-up.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
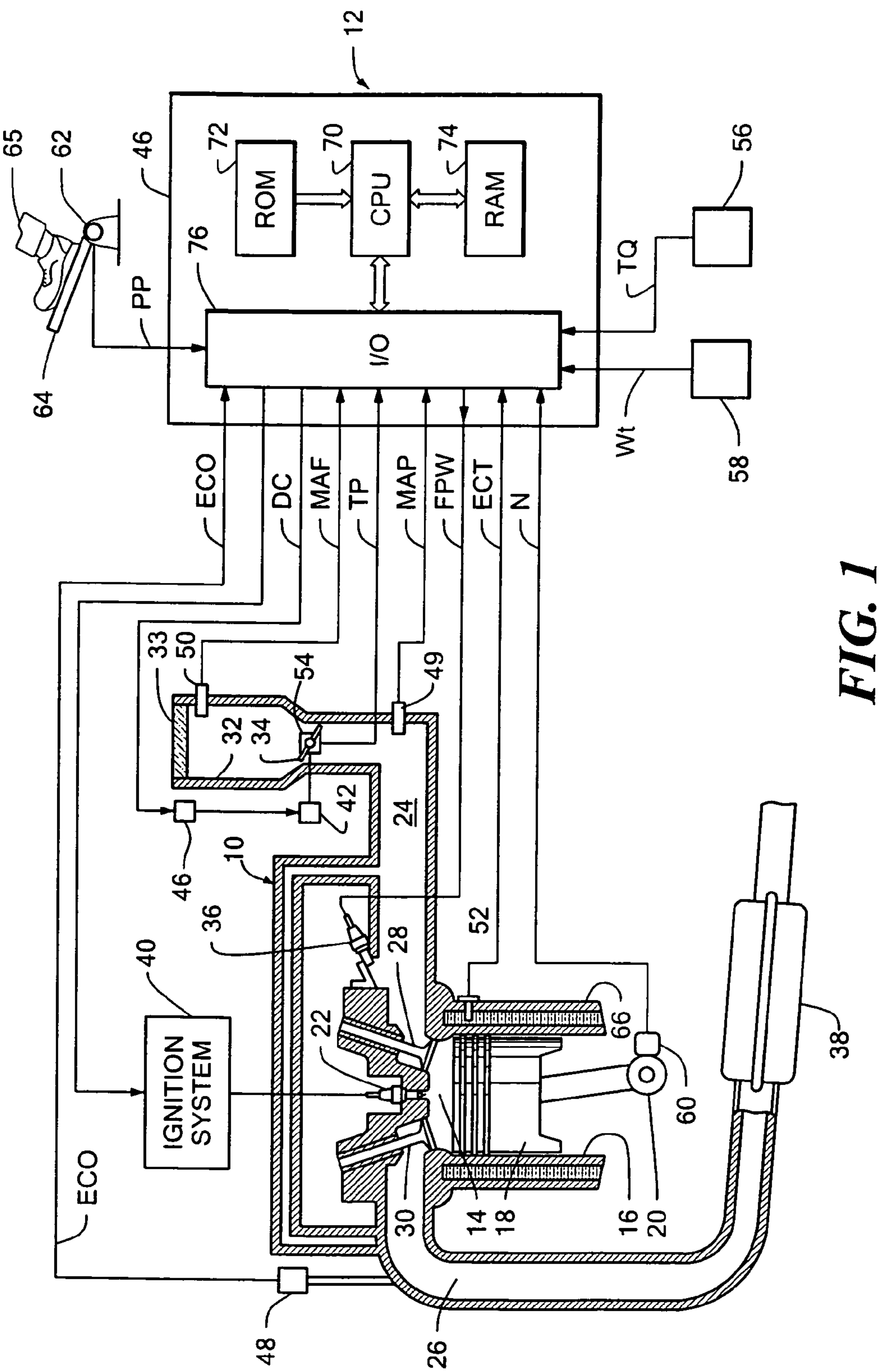
FIG. 1 is a block diagram of an internal combustion engine system having a system for indicating required maintenance of an air filter used with such engine according to the invention.

Referring to FIG. 1, include an internal combustion engine 10 and an engine control system 12 are shown. The engine 10 comprises a plurality of cylinders, one cylinder of which is shown in FIG. 1. Engine 10 further includes a combustion chamber 14, cylinder walls 16, a piston 18, a crankshaft 20, a spark plug 22, an intake manifold 24, an exhaust manifold 26, an intake valve 28, an exhaust valve 30, a throttle body 32, an air filter 33, a throttle plate 34, a fuel injector 36, and a catalytic converter 38.

Combustion chamber 14 communicates with intake manifold 24 and exhaust manifold 26 via respective intake and exhaust valves 28, 30. Piston 18 is positioned within combustion chamber 14 between cylinder walls 16 and is connected to crankshaft 20. Ignition of an air-fuel mixture within combustion chamber 14 is controlled via spark plug 22 which delivers ignition spark responsive to a signal from distributorless ignition system 40.

Intake manifold 24 communicates with throttle body 32 via throttle plate 34. Throttle plate 34 is controlled by electric motor 42 which receives a signal from ETC driver 44. ETC driver 44 receives a control signal (DC) from a controller 46. Intake manifold 24 is also shown having fuel injector 36 coupled thereto for delivering fuel in proportion to the pulse width of signals (FPW) from controller 46. Fuel is delivered to fuel injector 36 by a conventional fuel system (not shown) including a fuel tank, fuel pump, and fuel rail (now shown). Although a port fuel injection is shown, a direct fuel injection could be utilized instead of port fuel injection.

Exhaust manifold 46 communicates with catalytic converter 38 which reduces exhaust gases such a hydrocarbons (HC), nitrous oxides (NOx), and carbon monoxide (NO).

Control system 12 is provided to control the operation of the engine 10 in accordance with the present invention. Control system 12 includes distributorless ignition system 40, an electric motor 42 for controlling the throttle plate 34, an ETC driver 44, an exhaust gas sensor 48, a manifold absolute pressure (MAP) sensor 49, a mass air flow (MAF) sensor 50, a temperature sensor 52, a throttle position sensor 54, a torque sensor 56, a turbine speed sensor 58, a variable reluctance sensor 60, a pedal position sensor 62, an accelerator pedal 64 and controller 66.

In an alternate embodiment, throttle plate 34 may be directly connected to accelerator pedal 64 by a mechanical linkage or cable.

As illustrated in FIG. 1, the manifold absolute pressure sensor 49 is used to provide a signal (MAP) indicative of the manifold pressure to controller 46. Air first passes through the air filter 33 before passing through intake 34 into the combustion chambers or cylinders 14 through appropriate control of one or more intake valves. The intake and exhaust valves may be controlled directly or indirectly by controller 16 along with ignition timing (spark) and fuel to selectively activate/deactivate one or more cylinders 12 to provide variable displacement operation. The fuel injector 36 injects an appropriate quantity of fuel in one or more injection events based on a signal (FPW) generated by controller. Control of the fuel injection events is generally based on the position of the pistons within respective cylinders. Position information is acquired by an appropriate crankshaft sensor, not shown, which provides a position signal (PIP) indicative of crankshaft rotational position. At the appropriate time during the combustion cycle, controller 46 generates a spark signal (SA) which is processed by ignition system 40 to control spark plug 22 and initiate combustion within an associated cylinder.

Exhaust gas sensor 48 is conventional in the art and may comprise an EGO, HEGO, or UEGO oxygen sensor. As illustrated, the sensor 48 is coupled to exhaust manifold 26 upstream of catalytic converter 38. The sensor 48 may generate a signal EGO responsive to an oxygen concentration in the exhaust gases which is received by the controller 46.

Mass airflow sensor 50 generates a signal indicating the inducted mass airflow (MAF) which is received by the controller 46. The sensor 50 is conventional in the art and may be coupled to the throttle body 32 or intake manifold 24.

Temperature sensor 52 generates a signal indicating the engine coolant temperature (ECT) which is received by the controller 46. The sensor 52 is conventional in the art and is coupled to the cooling jacket 86 in the cylinder wall 16.

Throttle position sensor 54 generates a signal indicating a throttle position (TP) of the throttle plate 34 which is received by the controller 46. Accordingly, sensor 54 provides positional information of the plate 54 for closed-loop control of the plate 54.

Torque sensor 56 generates a signal indicating the transmission shaft torque or the engine shaft torque (TQ) which is received by the controller 46.

Turbine speed sensor 58 generates a signal (Wt) indicating the speed of a shaft connected to a turbine (not shown) which is received by the controller 46.

Variable reluctance sensor 60 generates a variable reluctance signal (VRS) that generates a profile ignition pickup signal (PIP) indicating an engine speed (N). In an alternate embodiment, sensor 60 may comprise a Hall effect sensor that generates a profile ignition pickup signal (PIP) indicating an engine speed (N). As illustrated the sensor 80 may be coupled to the crankshaft 20 and transmits the signal N to the controller 46.

Accelerator pedal 64 is shown communicating with the driver's foot 65. Pedal position sensor 62 generates a signal indicating acceleration pedal position (PP) that is transmitted to the controller 46.

The controller 46 is provided to implement a method in accordance with the present invention. The controller includes a microprocessor 70 communicating with various computer-readable storage media. The computer readable storage media preferably include volatile and nonvolatile storage in a read-only memory (ROM) 72, and a random-access memory (RAM) 94. The computer readable media may be implemented using any of a number of known memory devices such as PROMs, EPROMs, EEPROMs, flash memory or any other electric, magnetic, optical or combination memory device including, a semiconductor chip, capable of storing data, some of which represent executable instructions, used by the microprocessor 70 in controlling the engine. The microprocessor communicates with various sensors and actuators (discussed above) via an input/output (I/O) interface 76. Of course, the present invention could utilize more than one physical controller to provide engine/vehicle control depending upon the particular application.

Figure 2A:
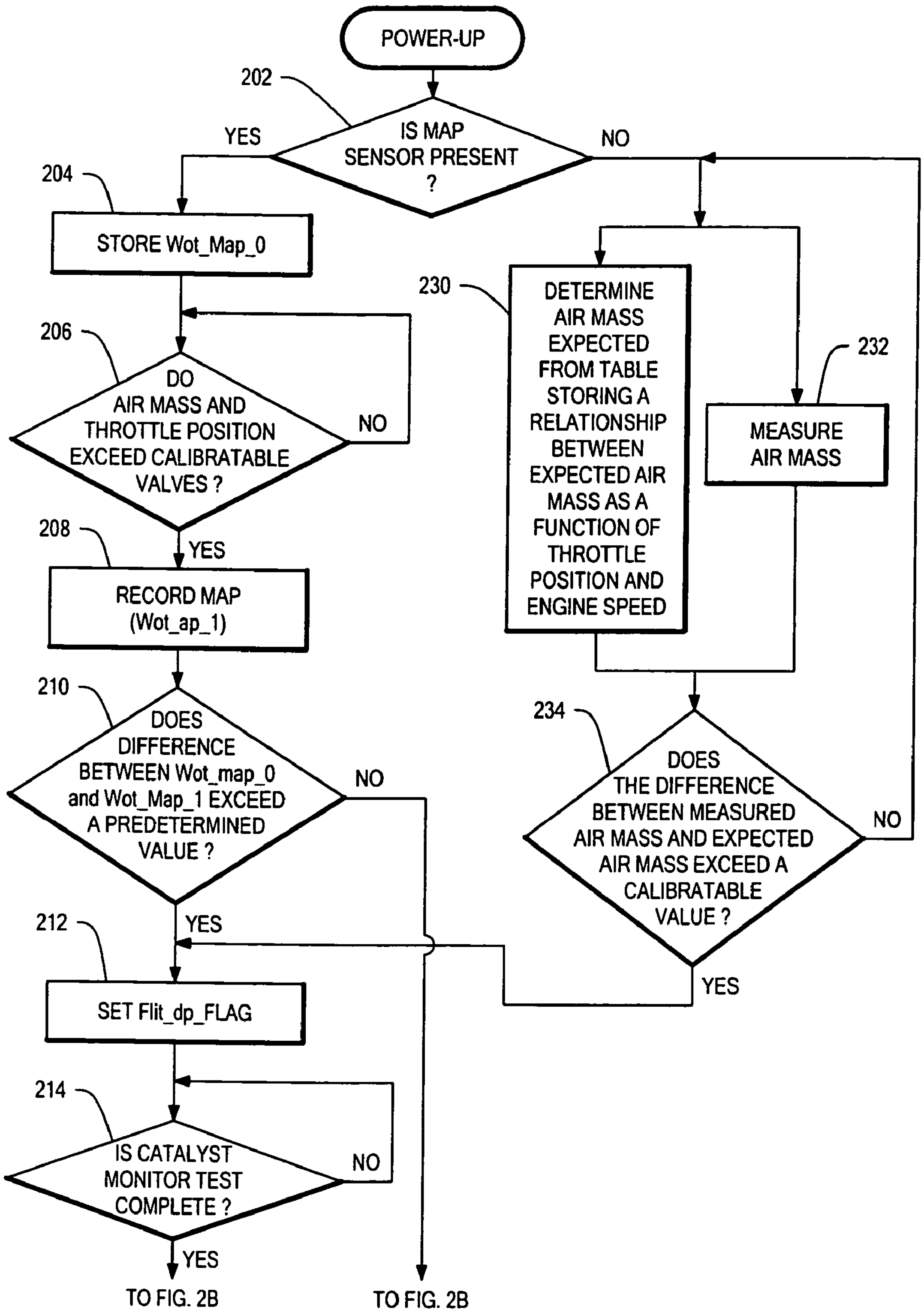
FIGS. 2A and 2B taken together is a flow diagram of a process used in the system of FIG. 1 to indicate required maintenance of an air filter according to the invention.
Figure 2B:
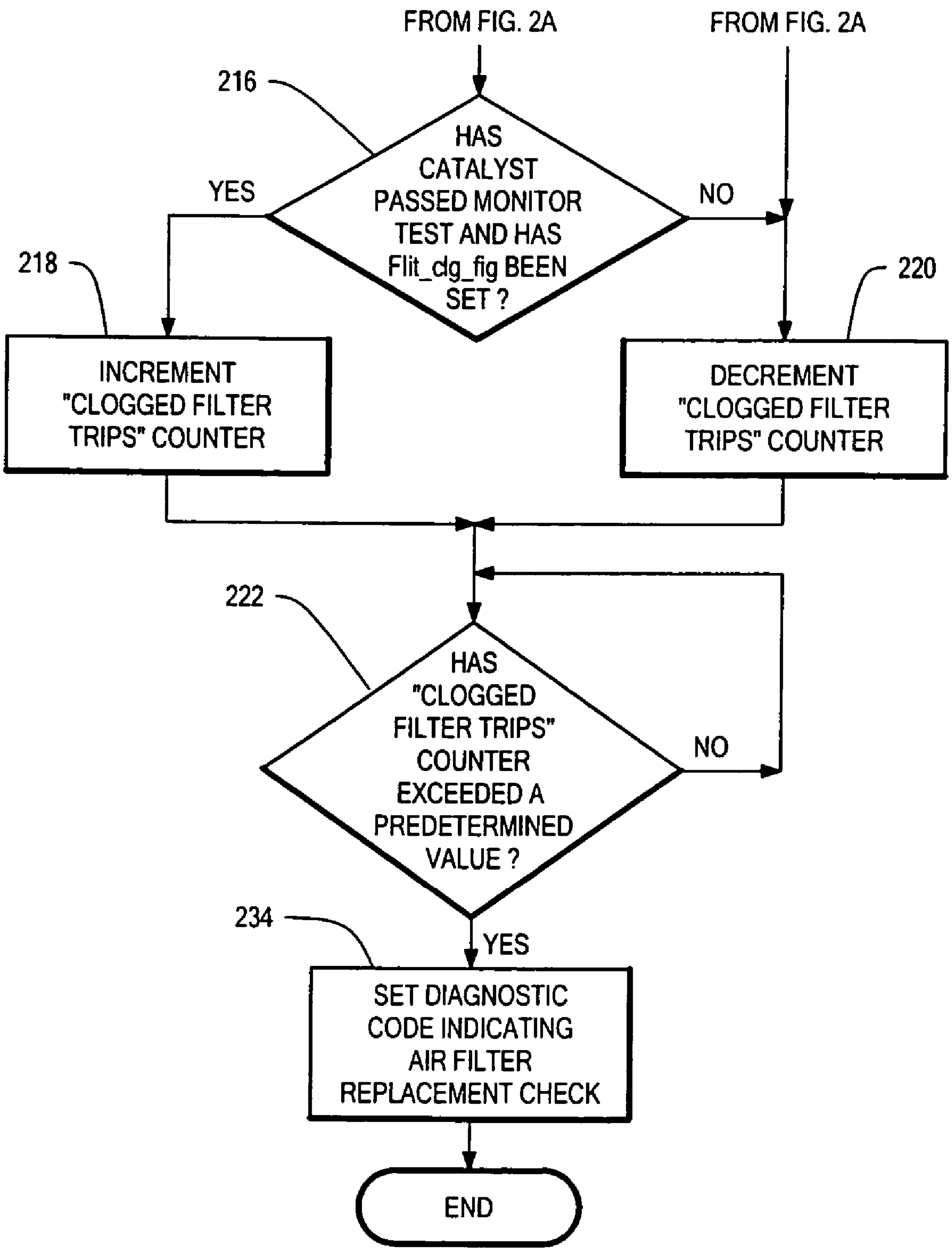
Figure 3:
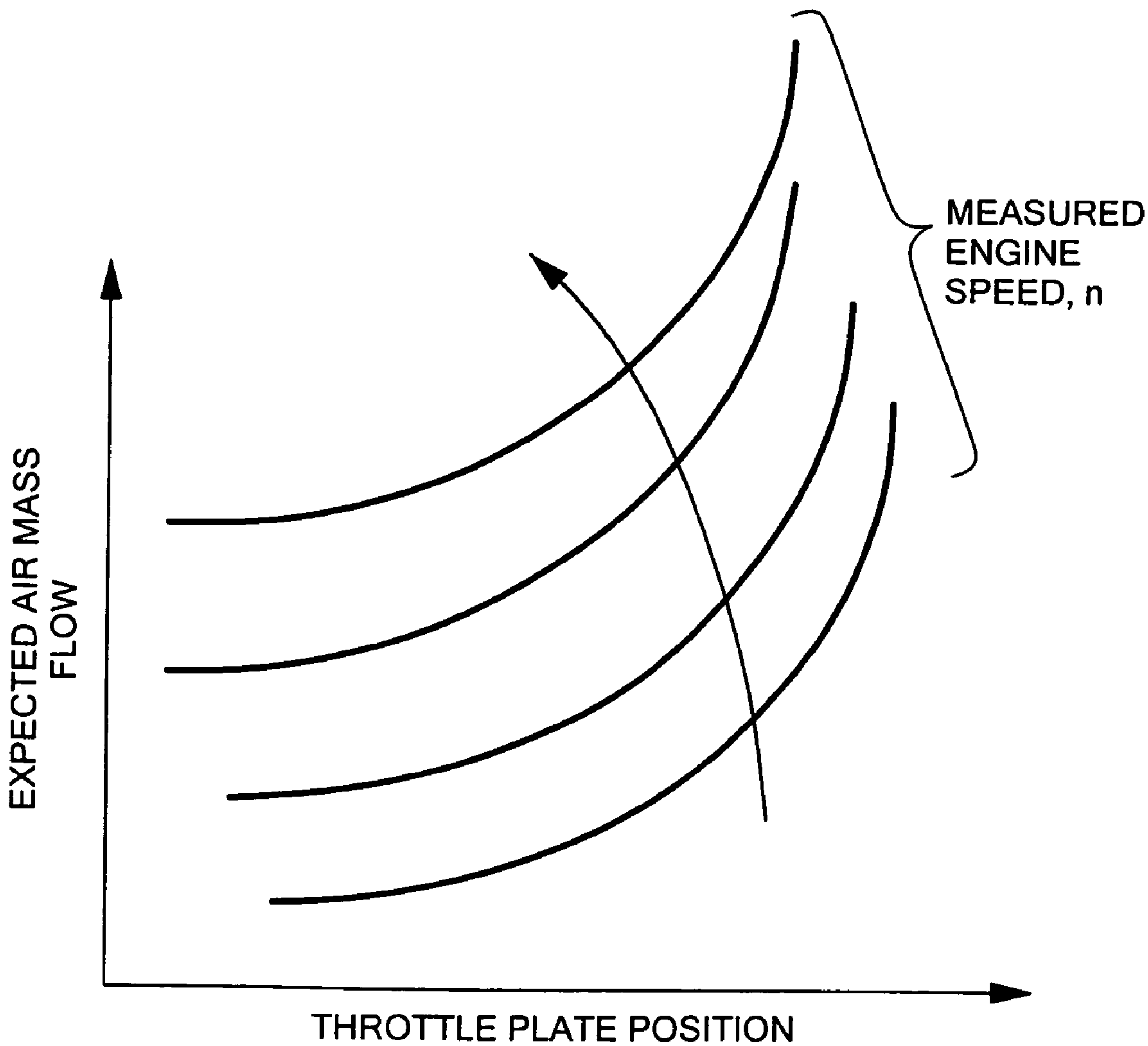
FIG. 3 is a set of curves showing the relationship between expected air flow as a function of position of a throttle used in the engine of FIG. 1 and engine speed, such set of curves being stored as a look-up table in the engine system of FIG. 1

Referring now to FIGS. 2A and 2B, a program flow diagram is shown for indicating required maintenance of an air filter 33, as for example when the air filter 33 is clogged. The program is stored is ROM 72 and executed by the processor 46. The process infers the air filter 33 is in need of maintenance, e.g., replacement, based on a difference between actual operating characteristics and predicted operating characteristics.

More particularly, on engine power.up (turning the engine ignition key, not shown, to the ignition "on" position but prior to the "engine start" position), the software (i.e., computer program) examines existing engine hardware to determine whether a manifold absolute pressure (MAP) sensor is present, Step 202. If present, a pre-start key-on value for MAP (Wot_Map_0)is read and stored in RAM 74, Step 204. This represents the current barometric pressure.

After vehicle has started, (in a MAP sensor equipped vehicle), the software monitors air mass (AM) using MAF sensor 50 and throttle position (TP) using sensor 54. When factory calibratible values for AM and TP are exceeded, the software records the value from the MAP sensor (Wot-_map_1). Step 206, 208. If the difference Wot_Map_0 and Wot_Map_1 exceeds and calibratible value, (Flit_dp), a flag is set and stored in RAM 74 to indicated a possible filter issue (Filt_clg_flg) (i.e., a possible clogged air filter), Steps 210, 212.

When the catalyst monitor is completed, Step 214, and if the catalyst monitor passed and the filter flag is set, a filter fault, the "clogged filter trips" counter in the CPU 70 is incremented, Step 216, 218. That is, passing the catalyst monitor testing verifies the exhaust system is operating properly. If the catalyst is failed and back pressure may be high and airflow will be low thereby effective the accuracy of the process detect a clogged air filter 33.

If the flag is not set, the "clogged filter trips " counter in the CPU 70 will be decremented, Step 220. When the "clogged filter trips" counter exceeds a factory calibratible value (Filt_clg_cnt), Step 222, a diagnostic code is set indicating air filter maintenance is required, Step 224. The diagnostic code can be retrieved with a scan tool.

It is noted that the process requires the use of only one pressure sensor rather than requiring one pressure sensor upstream of the air filter 33 and a second one downstream of the air filter 33 in order to measure, or estimate, the pressure drop across the air filter 33. That is, as the air filter 33 becomes clogged, a pressure difference will build up across it. With the system and method according to the present invention, only one pressure sensor is required to assess any pressure difference across the air filter 33 More particularly, the initial reading of the MAP 49 is assumed to be barometric pressure. As the pressure measured by the MAP increases above the initial value so that a difference between the initial reading and a current reading increases above the calibratable value, such may be a result of the air filter 33 becoming excessively dirty, or clogged, and thereof in need of maintenance, e.g., replacement.

However, because the vehicle may travel on a trip from a low sea level elevation to a high sea level elevation, the "clogged filter trips" counter is both incremented and decrements as indicated so as to account for the elevation change effects thereon.

If the vehicle is not MAP sensor equipped, (Step 202) the process compares the value from the Mass Air meter, i.e., MAF sensor 50, with the value from a look-up table which has been mapped to provide a normal Air mass value at a define throttle position and engine speed. While stored as a look up table, the relationship between expected air flow as a function of throttle plate position (TP) as measure by sensor 54 as a function of measured engine speed, N, via pickoff 60, is shown in FIG. 2, Steps 230, 232, 234. If the value from mass air sensor and the value inferred from the look-up table differ by more than a calibratible value the filter clogged flag (Filt_clg_flg)is set, Step 212 and the process continues through Steps 214 through 234 as described above.

A number of embodiments of the invention have been described. Nevertheless, it will be understood that various modifications may be made without departing from the spirit and scope of the invention. Accordingly, other embodiments are within the scope of the following claims.

What is claimed is:

1. A system for indicating required maintenance of an air filter used with an internal combustion engine, such engine including a throttle plate for adjusting an amount of air flow passing into cylinders of the engine, such system comprising:

a throttle plate position sensor;

a mass airflow sensor disposed downstream of the filter; and a processor responsive to a throttle plate position signal produced by the throttle plate sensor and a signal produced by the mass airflow sensor, for determining, as a function of such throttle plate position signal and the mass airflow signal, whether the air filter is in need of maintenance.

2. The system recited in claim 1 including a manifold absolute pressure sensor disposed between the throttle plate and the cylinders, and wherein the processor is responsive to a first reading of such manifold absolute pressure sensor taken at a first time and at a second reading of the manifold absolute pressure sensor taken at a second time, for determining, as a function of a difference between such first and second readings whether the air filter is in need of maintenance.

3. A system for indicating required maintenance of an air filter used with an internal combustion engine, such engine including a throttle plate for adjusting an amount of air flow passing into cylinders of the engine, such system comprising:

a throttle plate position sensor;

a manifold absolute pressure sensor disposed between the throttle plate and the cylinders; and;

a processor responsive to the throttle plate position signal and a signal produced by the manifold absolute pressure sensor, for determining, as a function of such throttle plate position signal and manifold absolute pressure sensor, whether the air filter is in need of maintenance.

4. The system recited in claim 3 including:

a mass air flow sensor disposed downstream of the air filter;

wherein the processor includes a table storing a relationship between throttle plate position and expected air mass flow into the cylinders as a function of engine speed;

wherein the processor is responsive to a signal indicative of engine speed and the throttle plate position signal for determining from the table an expected air flow;

wherein the processor determines a difference between the determined expected air flow and a signal produced by the mass air flow sensor, for determining, as a function of such difference, whether the air filter is in need of maintenance.

5. A system for indicating required maintenance of an air filter used with an internal combustion engine, such system comprising:

a throttle plate position sensor;

a manifold absolute pressure sensor; and a processor, responsive to a first reading of such manifold absolute pressure sensor taken at a first time and at a second reading of the manifold absolute pressure sensor taken at a second time, for determining, as a function of a difference between such first and second readings and a signal produced by the throttle plate sensor whether the air filter is in need of maintenance.

6. A method for indicating required maintenance of an air filter used with an internal combustion engine, such engine including a throttle plate for adjusting an amount of air flow passing into cylinders of the engine, such method comprising:

determining, as a function of a throttle plate position signal produced by a throttle plate position sensor and the amount of air flow, whether the air filter is in need of maintenance.

7. The method recited in claim 6 wherein the air filter maintenance determining is a function of the throttle plate position signal and a signal produced by an manifold absolute pressure sensor disposed between the throttle plate and the cylinders.

8. The method recited in claim 6 wherein the air filter maintenance determining is a function a signal indicative of engine speed and the throttle plate position signal for determining an expected air flow, and a difference between the determined expected air flow and a signal produced by an mass air flow sensor.

9. The method recited in claim 8 wherein the air filter maintenance determining is a function a difference between a first reading of the manifold absolute pressure sensor taken at a first time and at a second reading of the manifold absolute pressure sensor taken at a second time.

10. The method recited in claim 9 wherein the first reading is representative of barometric pressure.

11. The method recited in claim 10 wherein the first reading is taken at engine power-up.

12. A method for indicating required maintenance of an air filter used with an internal combustion engine, comprising:

obtaining a first reading of a manifold absolute pressure sensor at a first time and at a second reading of the manifold absolute pressure sensor taken at a second time; and determining, as a function of a difference between such first and second readings and the position of a throttle plate for adjusting air flow to the engine, whether the air filter is in need of maintenance.

13. The method recited in claim 12 wherein the first reading is representative of barometric pressure.

14. The method recited in claim 13 wherein the first reading is taken at engine power-up.

15. An article of manufacture comprising:

a computer storage medium having a computer program encoded therein code for determining, as a function of a throttle plate position signal produced by a throttle plate position sensor and air flow to the engine, whether the air filter is in need of maintenance.

16. The article of manufacture recited in claim 15 including code for determining air filter maintenance as a function of the throttle plate position signal and a signal produced by an manifold absolute pressure sensor.

17. The article of manufacture recited in claim 16 including code for determining air filter maintenance as a function a signal indicative of engine speed and the throttle plate position signal to determining an expected air flow, and a difference between the determined expected air flow and a signal produced by an mass air flow sensor.

18. The article of manufacture recited in claim 17 including code for detennining a difference between a first reading of a manifold absolute pressure sensor taken at a first time and at a second reading of the manifold absolute pressure sensor taken at a second time.

19. The article of manufacture recited in claim 18 wherein the first reading is representative of barometric pressure.

20. The article of manufacture recited in claim 19 wherein the first reading is taken at engine power-up.

21. The article of manufacture recited in claim 18 wherein the computer storage medium is a semiconductor chip.

22. The article of manufacture recited in claim 17 wherein the computer storage medium is a semiconductor chip.

23. The article of manufacture recited in claim 16 wherein the computer storage medium is a semiconductor chip.

24. The article of manufacture recited in claim 15 wherein the computer storage medium is a semiconductor chip.

25. An article of manufacture comprising:

a computer storage medium having a computer program encoded therein code for determining, as a function an obtaining first reading of a manifold absolute pressure sensor at a first time and at a second reading of the manifold absolute pressure sensor taken at a second time and a function of a difference between such first and second readings and a measure of air flow to the engine whether the air filter is in need of maintenance.

26. The article of manufacture recited in claim 25 wherein the first reading is representative of barometric pressure.

27. The article of manufacture claim 26 wherein the first reading is taken at engine power-up.

28. The article of manufacture recited in claim 25 wherein the computer storage medium is a semiconductor chip.

* * * * *

UNITED STATES PATENT AND TRADEMARK OFFICE

CERTIFICATE OF CORRECTION

PATENT NO. : 7,032,573 B2

APPLICATION NO. : 10/831570

DATED : April 25, 2006

INVENTOR(S) : Ardisana

It is certified that error appears in the above-identified patent and that said Letters Patent is hereby corrected as shown below:

Insert

(75) Inventor: John Bernard Ardisana, Farmingham, MI (US)
Douglas Raymond Martin, Canton, MI (US)
Michael John Cullen, Northville, MI (US)
Freeman Carter Gates, Bloomfield, MI (US)

Signed and Sealed this

Eighth Day of January, 2008

JON W. DUDAS

*Director of the United States Patent and Trademark Office*

UNITED STATES PATENT AND TRADEMARK OFFICE

CERTIFICATE OF CORRECTION

PATENT NO. : 7,032,573 B2
APPLICATION NO. : 10/831570
DATED : April 25, 2006
INVENTOR(S) : Ardisana It is certified that error appears in the above-identified patent and that said Letters Patent is hereby corrected as shown below:

On The Title Page Item [75] Inventor: Insert John Bernard Ardisana, Farmingham, MI (US)
Douglas Raymond Martin, Canton, MI (US)
Michael John Cullen, Northville, MI (US)
Freeman Carter Gates, Bloomfield, MI (US)

Signed and Sealed this

Twenty-second Day of January, 2008

JON W. DUDAS
*Director of the United States Patent and Trademark Office*

UNITED STATES PATENT AND TRADEMARK OFFICE

CERTIFICATE OF CORRECTION

PATENT NO. : 7,032,573 B2
APPLICATION NO. : 10/831570
DATED : April 25, 2006
INVENTOR(S) : John Bernard Ardisana It is certified that error appears in the above-identified patent and that said Letters Patent is hereby corrected as shown below:

This certificate supersedes certificate of correction issued January 22, 2008. The certificate should be vacated since petition for correction of inventorship was not granted for this patent number.

Signed and Sealed this

Fifth Day of February, 2008

JON W. DUDAS
*Director of the United States Patent and Trademark Office*